United States Patent [19]

La Grange et al.

[11] Patent Number: 5,347,282
[45] Date of Patent: Sep. 13, 1994

[54] APPARATUS FOR THE OBSERVATION AND INDENTIFICATION OF HELICOPTERS

[75] Inventors: Richard E. M. G. La Grange; Willem A. Hol, both of Hengelo, Netherlands

[73] Assignee: Hollandse Signaalapparaten B.V., Hengelo, Netherlands

[21] Appl. No.: 957,784

[22] Filed: Oct. 8, 1992

[30] Foreign Application Priority Data

Oct. 16, 1991 [NL] Netherlands ............. 9101720

[51] Int. Cl.$^5$ ................. G01S 13/50; G01S 7/292
[52] U.S. Cl. .................. 342/193; 342/196; 342/90
[58] Field of Search ............. 342/193, 90, 91, 92, 342/196

[56] References Cited

U.S. PATENT DOCUMENTS

| | | | |
|---|---|---|---|
| 4,275,396 | 6/1981 | Jacomini | 342/93 |
| 4,389,647 | 6/1983 | Fanuele et al. | 342/192 |
| 4,490,718 | 12/1984 | Opitz et al. | 342/192 |
| 4,670,753 | 6/1987 | Vacanti | 342/90 |
| 5,070,335 | 12/1991 | Lewis et al. | 342/90 |
| 5,081,459 | 1/1992 | Guillerot et al. | 342/90 |
| 5,124,710 | 6/1992 | Debuisser | 342/204 |

FOREIGN PATENT DOCUMENTS

| | | |
|---|---|---|
| 0429335 | 5/1991 | European Pat. Off. . |
| 0443243 | 8/1991 | European Pat. Off. . |
| 2928907 | 6/1981 | Fed. Rep. of Germany . |
| 3002148 | 10/1981 | Fed. Rep. of Germany . |
| 3740141 | 6/1989 | Fed. Rep. of Germany . |

Primary Examiner—John B. Sotomayor
Attorney, Agent, or Firm—Oblon, Spivak, McClelland, Maier & Neustadt

[57] ABSTRACT

Apparatus for the observation and identification of helicopters by means of an FM-CW radar apparatus provided with transmitter means (1), antenna means (2) and receiver means (3). Blade flashes caused by the rotor blades are digitized by A/D converter (4) and processed by Fourier analysis means (5) and processor (6) in order to determine the range from a helicopter to the radar apparatus and the rotor symmetry characteristics. These symmetry characteristics, together with the blade flash repetition frequency yield a substantially unambiguous indication of the helicopter type.

12 Claims, 4 Drawing Sheets

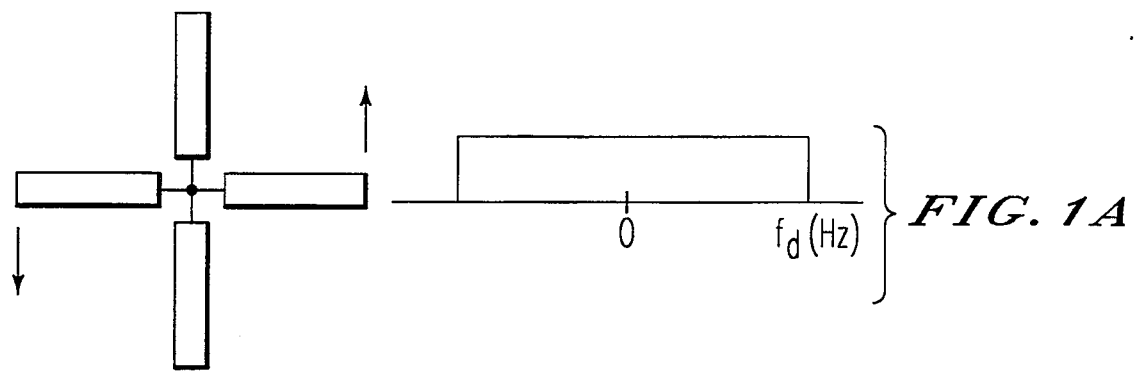
*FIG. 1A*
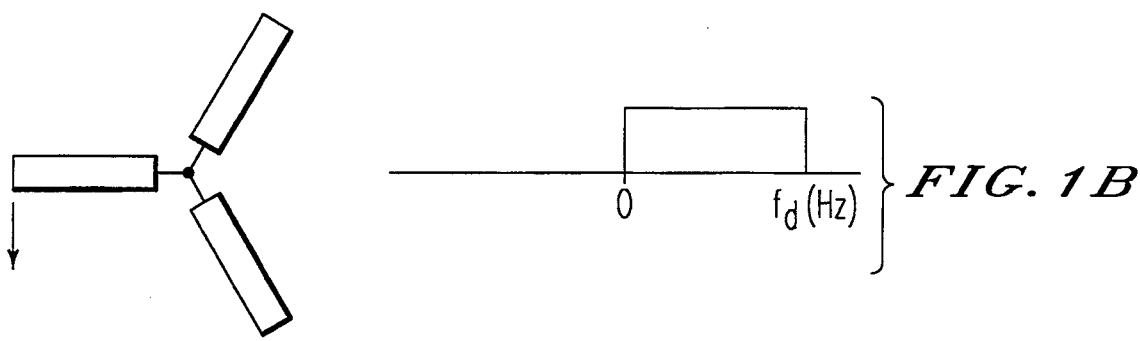
*FIG. 1B*
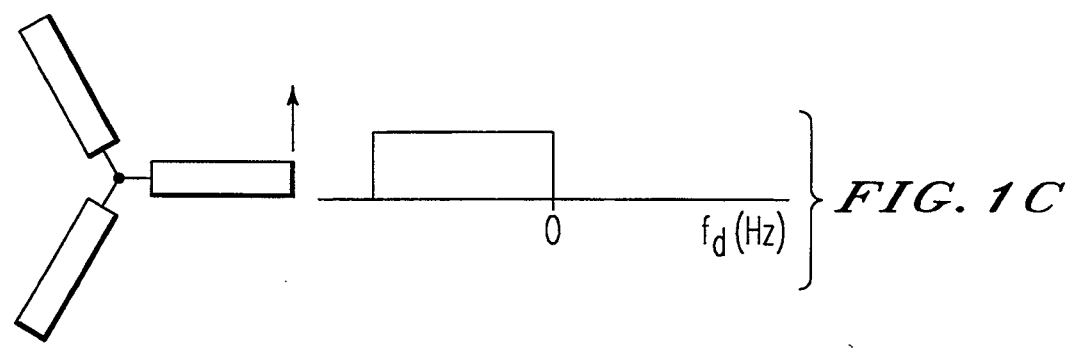
*FIG. 1C*
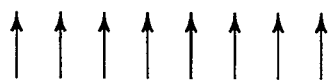

APPARATUS FOR THE OBSERVATION AND INDENTIFICATION OF HELICOPTERS

BACKGROUND OF THE INVENTION

The invention relates to a doppler radar apparatus, comprising transmitter means and receiver means coupled to antenna means, and processor means coupled to the receiver means, for the detection of helicopters by blade flashes caused by helicopter rotor blades and the identification of helicopters by determining the repetition frequencies of the blade flashes.

Such a radar apparatus is known from the Patent Specification U.S. Pat. No. 4,389,647. In the above-mentioned radar apparatus, output signals of a Doppler radar are rectified and passed through a high-pass filter. In the event of a helicopter the resulting blade flashes, i.e. strong radar echoes caused by the helicopter rotor blades which are briefly perpendicular to the radar beam, will produce a signal at the output of the high-pass filter. The repetition frequency of this signal, which corresponds with the repetition frequency of the blade flashes makes it possible to draw a conclusion as to the helicopter type.

This method has the drawback that valuable information concerning the type of helicopter is lost in the course of the rectifying process.

SUMMARY OF THE INVENTION

The radar apparatus according to the invention obviates this drawback and is characterised in that the radar apparatus is provided with means for the determination of Doppler spectra for individual blade flashes.

According to the above-mentioned patent specification, the Doppler radar may be either a pulsed type or a CW type of radar. Both radar types experience drawbacks with regard to the detection and identification of helicopters. In order to observe each single blade flash, the pulse radar must have a high pulse repetition frequency. This makes the radar relatively expensive and insensitive and it may furthermore cause range ambiguity. The CW radar does not provide range information. Moreover, a well-known problem with CW radars, is the occurrence of 1/f noise, as a result of which echoes from the rotor blades, having a Doppler shift of just a few kilohertz, are difficult to detect.

An exceptionally favourable embodiment of the radar apparatus according to the invention does not experience these drawbacks and is characterized in that the transmitter means are equipped for the transmission of periodical linear frequency modulated signals, the receiver means are equiped with mixing means for the generation of a heterodyne signal from a signal representing the transmitted signal and received radar echoes, and the processor means are equipped with Fourier analysis means for the transformation of the heterodyne signals originating from consecutive periods into consecutive frequency spectra, where every spectrum is represented by N complex values (N=2, 3, 4, ...).

A frequency spectrum thus realised makes it possible to determine the range between an observed helicopter and the radar apparatus and also reveals whether the number of helicopter rotor blades is odd or even.

BRIEF DESCRIPTION OF THE DRAWINGS

The invention will now be explained in more detail with reference to the following figures, of which:

FIG. 1 represents a number of rotors with the associated spectra;

DETAILED DESCRIPTION OF THE INVENTION

In a Doppler radar, echoes of stationary or slow-moving objects are removed by means of filters. In view of this, it is difficult to spot the fuselage of a hovering or slow-moving helicopter by means of a Doppler radar. It is, however, possible to observe the rotor blades rotating at a high speed. A rotating helicopter rotor blade which, during brief periods, is perpendicular to the radar beam, is known to produce a short, strong echo, a so-called blade flash. Blade flashes reveal the presence of a helicopter and their repetition frequency is connected to the helicopter type. On the basis of this principle, radar apparatuses according to the state of the art are capable of generating an alert and a type-identification if a helicopter approaches the radar apparatus. In this respect it is assumed that for each individual helicopter, the rotor rpm varies within certain narrow limits. It is impossible to unambiguously assign certain repetition frequencies to a certain type of helicopter. A series of blade flashes having for example a repetition frequency of 28 Hz could either be produced by a B105 helicopter or by a US Bradley 2B helicopter. In view of this consideration, it is advisable to search for additional criteria in order to increase the reliability of a type-identification.

An additional criterion may be found in the spectrum of a blade flash, as presented in FIG. 1.

FIG. 1A schematically represents the rotor of a B105 helicopter plus the spectrum of the associated blade flash. The positive part of the spectrum is caused by the blade which rotates in the direction of the impinging radar radiation. The highest frequency is generated by the tip, which generally rotates at a speed of 230 m/sec. The negative part of the spectrum is caused by the blade moving in the opposite direction. The spectrum is substantially symmetrical.

FIG. 1B schematically represents the rotor of a US Bradley 2B helicopter plus the spectrum of the associated blade flash. Only a blade moving towards the radar is perpendicular to the radar beam. Therefore, the spectrum has substantially a positive part only. If the rotor rotates through an angle of $\pi/3$ radians, we encounter the situation as schematically represented in FIG. 1G, in which the blade flash has a spectrum with substantially a negative part only.

The spectra indicated in FIG. 1 are based on the assumption of a substantially stationary helicopter so that reflections from the helicopter fuselage produce a Doppler tone of approximately 0 Hz. If the helicopter moves with a certain speed in a direction of the radar apparatus, the entire spectrum will shift in positive direction. Since the speed of the helicopter is mostly a mere fraction of the speed of the tip, the nature of the spectra, as represented in FIG. 1A, B, C will remain unchanged.

Figure 2:
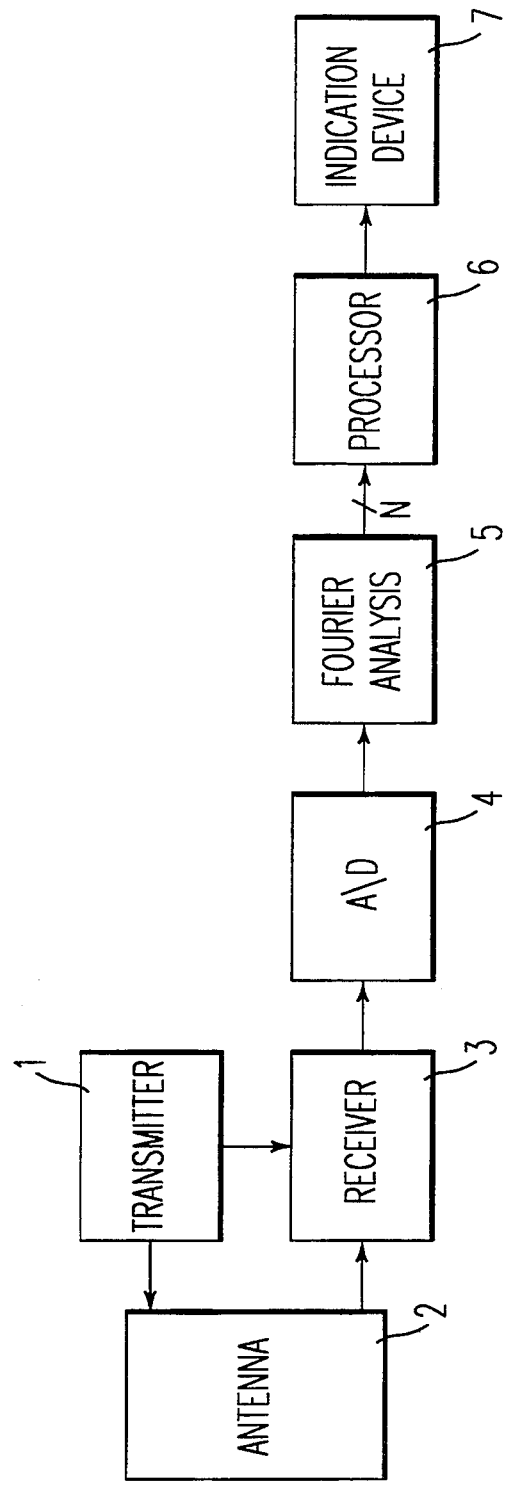
FIG. 2 represents a block diagram of a possible embodiment of the radar apparatus according to the invention.

FIG. 2 represents a block diagram of a possible embodiment of the radar apparatus according to the invention. Using antenna means 2, transmitter means 1 transmit radar radiation in the direction of the helicopter. Via antenna means 2 the reflections are applied to receiver means 3 and mixed with a reference signal derived from transmitter means 1. Heterodyne signals thus obtained are digitized in A/D converter 4 and applied to Fourier analysis means 5, usually an FFT unit. Processor 6 examines the spectra thus obtained for the presence of blade flashes, for the shape of the spectra as well as for the time which elapses between successive blade flashes. It is thus possible, with a large measure of probability, to identify the helicopter type and to subsequently present it for display on indication means 7.

In a first specific embodiment of the radar apparatus according to the invention, CW radar radiation with a wavelength of 23 cm is emitted by transmitter means 1. Assuming a customary blade tip speed of 230 m/sec, this yields a Doppler signal which may range from $-2$ kHz to $+2$ kHz. A/D converter 4 will digitize this signal at a sampling frequency of 4 kHz and will apply this digital signal to Fourier analysis means 5, a 4-point FFT unit. This FFT unit has four output signals, which represent $-2$ kHz, $-1$ kHz, 0 kHz and 1 kHz. The modulus of the signals representing $-1$ kHz and 1 kHz are applied to processor 6, which is in this case provided with two threshold circuits and a combination circuit. If at least one of these signals exceeds a predefined threshold, a blade flash detection will be generated. If both signals are substantially of equal intensity, an even number of rotor blades is assumed. If both signals appear alternately, an odd number of rotor blades is assumed. Processor 6 furthermore examines how much time elapses between successive blade flashes, after which the helicopter type is identified with a large measure of probability.

The above-described first specific embodiment can be considerably improved on several counts. One improvement would be to generate a range indication for an observed helicopter. The second improvement would be to reduce the near-inevitable detection loss inherent in a CW radar on account of 1/f noise. Received Doppler shifted signals have to contend with 1/f noise from transmitter means 1 which, upon reflection from any nearby object, enters the receiver means 3. Since in the above-described embodiment, Doppler shifted signals are only approx. 1 kHz removed from the transmitted GW signal, serious detection losses may be anticipated.

In a second specific embodiment, transmitter means 1 also emit CW radar energy with an approximate wavelength of 23 cm, however, in this case provided with FM-GW modulation. A sawtooth frequency modulation might be suitable, whereby at periodical intervals, the frequency increases linearly by 2.5 MHz during a period of 500 μsec. The application of this well-known method enables stationary objects to generate heterodyne signals at a frequency which depends on their range to the radar apparatus. Fourier analysis means 5 may comprise an FFT unit of 256 outputs for splitting the heterodyne signals, obtained during one period of the sawtooth frequency modulation into 256 frequency ranges of 0, 2 kHz, 4 kHz, ..., 512 kHz. These frequency ranges subsequently correspond with ranges of 0, 60 m, 20 m, ..., 15360 m. In this way, an FM-GW radar apparatus, well-known from the technical literature, is realised. If this radar apparatus is directed at a substantially stationary helicopter, a spectrum develops which consists of a heterodyne frequency caused by the helicopter fuselage which frequency is substantially the same for each period, and on occasion, during the occurrence of a blade flash, a more complex spectrum. This spectrum corresponds with one of the spectra represented in FIG. 1, only in this case it is shifted by a frequency which corresponds with the heterodyne frequency caused by the fuselage echo.

Figure 3:
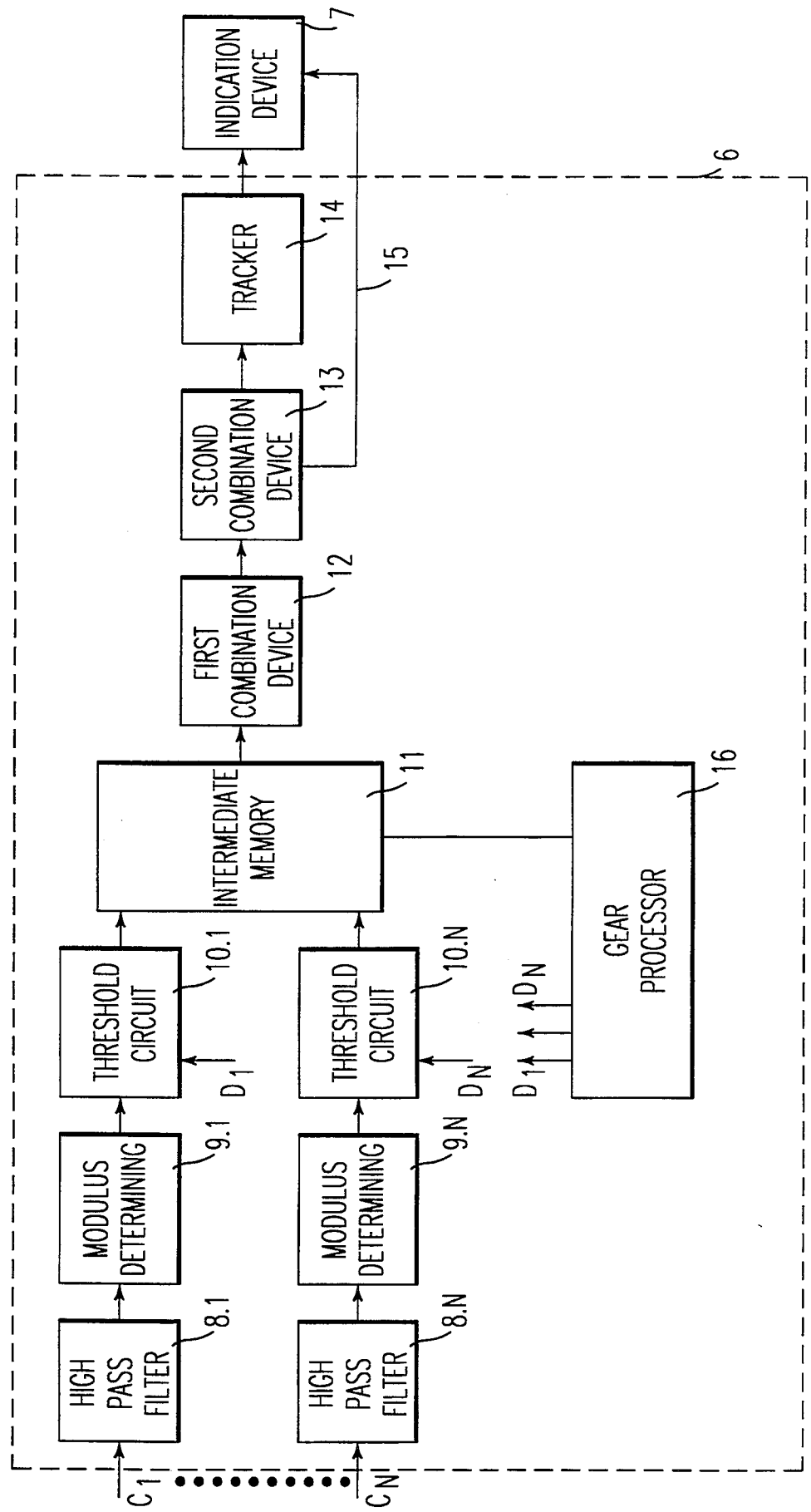
FIG. 3 represents a block diagram of a possible embodiment of the processor of the radar apparatus according to the invention.

FIG. 3 represents a block diagram of processor 6 of the radar apparatus according to the second specific embodiment. Processor 6, connected to the N outputs of the Fourier analysis means 5, shall first of all remove any echoes of stationary objects. To this end, processor 6 is provided with N high-pass filters 8.1, ..., 8.N, connected to the N outputs $C_1$, ..., $C_N$ of the Fourier analysis means 5. By selecting the cut-off frequencies of the filters such that, for instance, also reflections from cars and other vehicles are stopped, only the spectra caused by the blade flashes will eventually provide filter output signals. These filter output signals are applied to modulus-determining elements 9.1 ...., 9.N. Their outputs are applied to threshold circuits 10.1 ..... 10.N. Threshold passings are stored in an intermediate memory 11, for example by storing per period the numbers of the threshold circuits at which the threshold passings took place. Several consecutive numbers within one period may indicate the presence of a helicopter.

Entirely analogous to the first embodiment, a helicopter with an even number of rotor blades will generate a relatively wide spectrum, which is the same for consecutive flashes. A helicopter with an odd number of rotor blades yields a narrower spectrum, which moreover varies from flash to flash, but with even flashes continuously presenting the same spectrum and odd flashes continuously presenting the same spectra. In the above-described second specific embodiment, a helicopter with an even number of rotor blades will generally produce an output signal with four consecutive threshold passings per period. A helicopter with an odd number of rotor blades will generally produce an output signal with only two consecutive threshold passings, while the spectra of odd and even flashes will generally produce output signals on different threshold circuits, for example alternatively on 10.j, 10.j+1 and on 10.j+2, 10.J+3.

The intermediate memory is read by a first combination device 12, which combines substantially consecutive threshold passings originating from one flash to form a group, which determines the group's spectral width and which determines, for the group, the range of the helicopter associated to the group to the radar apparatus. On the basis of the spectral width, the first combination means furthermore endeavours to ascertain whether the number of rotor blades of the helicopter concerned is odd or even. Groups of more than five consecutive threshold passings within one period or less than two consecutive threshold passings within one period are rejected by the first combination means. If a blade flash which, at said wavelength has a duration of approx. 500 μsec, at least substantially coincides with one period of the sawtooth frequency modulation it will be possible to decide on the basis of one blade flash if the number of blades is odd or even. The situation in which a blade flash partially occurs in one period and partially in a subsequent period is less favorable. The resulting spectral widening may render it impossible to draw a conclusion on the basis of this single blade flash. A second measurement may than be necessary. The first combination device is designed such that the thresold passings in two or more consecutive periods are combined to form one group.

Groups determined by the first combination device are, together with a system time, passed to a second combination device 13. This device seeks to collect and combine consecutive helicopter blade flashes. To this end, groups with equal ranges and equal spectral widths are combined and the time delay is determined. The second combination device 13 provides plot messages at least comprising range and blade flash frequency as well as a parameter for establishing whether the number of rotor blades is odd or even. Plots thus obtained are reliable and reproducible to such an extent that a search radar apparatus for helicopters can be realised on the basis of the second special embodiment. A precondition, however, is that the search radar apparatus antenna means 2 are dimensioned such that for every possible helicopter at least two consecutive blade flashes can be observed. Thus, it will at all times be possible to establish whether the number of rotor blades is odd or even and to determine the blade flash frequency. A possible choice could be 40 revolutions per minute and a horizontal aperture angle of $\pi/6$ radians for antenna means 2. In spite of the relatively poor azimuth accuracy of the search radar apparatus on account of the wide horizontal aperture angle, the azimuth resolution is excellent, because blade flashes are only visible during typically two periods.

If a search radar apparatus is realised on the basis of the second embodiment, the second combination device 13 is capable, on the basis of the consecutive groups, of assessing the azimuth direction of the helicopters, which is to be added to the plot messages. Subsequently, these plot messages can be processed in tracker 14 to result in tracks, which are presented for display on indication device 7.

A tracker has the advantage of reducing the false-alarm rate. To this end, tracker 14 requires, for instance, that a certain helicopter type is observed at a like range and in a like azimuth direction during at least two successive antenna revolutions. This, however, renders a quick detection of a pop-up helicopter impossible. For this purpose, the second combination device 13 is equipped with a library from which the user may designate three helicopter types, which are considered to be highly threatening. If a helicopter thus designated is detected, i.e. if a plot message is generated with similar characteristics, this plot message is immediately passed to indication means 7 via line 15.

In the second special embodiment, detection loss caused by 1/f noise, has less far-reaching effects. Assuming, for instance, a helicopter being detected at a range of 7.5 km. The helicopter spectrum will then be situated at approx. 250 kHz. If a search radar apparatus is realised on the basis of the first special embodiment, that same helicopter will have a spectrum of approx. 1 kHz. With respect to the 1/f noise contribution, this results in an improvement of almost 50 dB.

An object with a large radar cross section in the vicinity of the radar apparatus may nevertheless result in an increase of the noise level, even to such an extent that the threshold circuits 10.1, ..., 10.N are activated. To prevent this, processor 6 is provided with a constant false-alarm processor: CFAR 16. According to known methods which involve the adjustment of the threshold values $D_1, ..., D_N$, this processor aims at keeping the number of threshold passings per unit of time substantially constant. Since, during the rotation of antenna means 2, such an object gradually appears in the antenna beam, an effective CFAR can thus be obtained.

Figure 4:
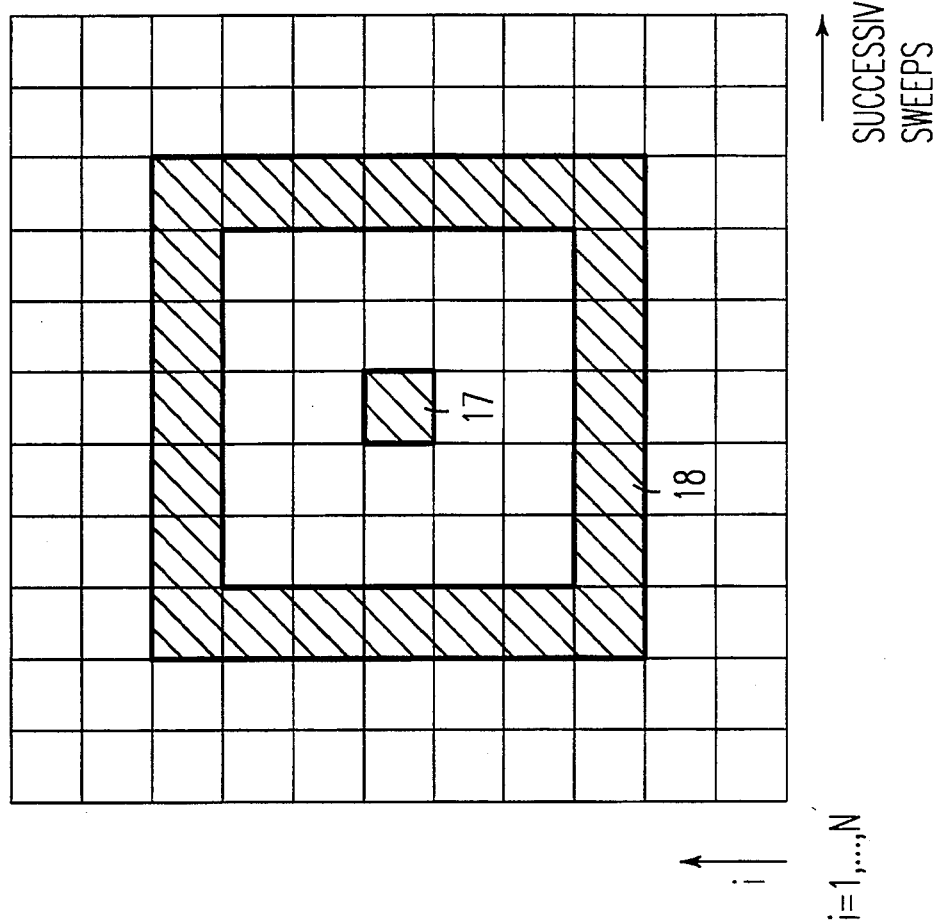
FIG. 4 represents a part of a two-dimensional data field, to illustrate a CFAR, based on the two-dimensional window method.

An alternative embodiment of a CFAR combines the threshold function and the CFAR function with the first combination device 12. Threshold circuits 10.1, ..., 10.N and CFAR 16 are then absent. The signal strengths, generated by de modulus-determining elements 9.1, ..., 9.N will immediately be stored in intermediate memory 11, in a two-dimensional field, a part of which is presented in FIG. 4. The consecutive periods are stored in horizontal direction, the signal strengths generated by the modulus-determining elements 9.1, ..., 9.N are stored in vertical direction. This two-dimensional field is scanned for the presence of helicopters by means of a two-dimensional window, which in this example is 7 periods by 7 signal strengths, whereby a signal strength in a central area 17 is applied to a threshold circuit and compared with an average signal strength calculated for peripheral area 18. The first combination device 12 may be designed as a high-speed processor, which first thresholds the signal strengths present in the two-dimensional field, and subsequently combines the individual threshold passings to form groups and ultimately examines whether the number of rotor blades of the helicopters associated with these groups is odd or even. The alternative embodiment of a CFAR has the advantage that the radar apparatus is less susceptible to interference, particularly to noise jamming.

Although for the first as well as the second embodiment, radar radiation having a wavelength of 23 cm has been selected, each wavelength is suitable for the invention described here. The advantage of long wavelengths is that the blade flash is of relatively long duration and is distributed over a small part of the frequency spectrum only, which favourably affects the price of the processing. Short wavelengths on the other hand result in increased radar cross sections of rotor blades and in reduced antenna dimensions.

We claim:

1. An FMCW radar apparatus for the detection and identification of at least one helicopter having rotor blades, comprising:

transmitter means coupled to directional antenna means, for the transmission of periodical linear frequency-modulated signals, with a time duration of one period taken at least substantially equal to an expected duration of one blade flash from the helicopter rotor blades;

receiver means coupled to the antenna means and provided with mixing means for the generation of heterodyne signals from a signal representing the transmitted signal and received radar echoes;

Fourier analysis means for the transformation per period of the heterodyne signals for obtaining a spectrum of the blade flash; and processor means for deriving from the spectrum and its symmetry structure the helicopter distance and the symmetry structure of its rotor.

2. An FMCW radar as claimed in claim 1, wherein the Fourier analysis means transforms consecutive periods into spectrum each represented by N complex values, which are applied to N high-pass filters, followed by N modulus-determining elements, followed by N threshold circuits, and where the threshold data is stored into an intermediate memory for further processing for reducing the false alarm rate and for obtaining the at least one helicopter blade flash frequency.

3. An FMCW radar apparatus as claimed in claim 2, wherein the processor means are provided with constant false alarm rate means for adjusting threshold values connected to the threshold circuits such that a substantially constant number of threshold passings per unit of time is obtained.

4. An FMCW radar apparatus as claimed in claim 3, wherein the processor means are provided with first combination means for the determination of groups of threshold passings associated with one blade flash on the basis of threshold passing data stored into the intermediate memory, and with means for the determination of the range of helicopters associated with these groups, and for establishing whether these helicopters are provided with an odd or even number of blades.

5. An FMCW radar apparatus as claimed in claim 1, wherein the Fourier analysis means transforms consecutive periods into spectra each represented by N complex values which are applied to N high-pass filters followed by N modulus-determining elements, the output values of which are stored in an N wide memory field for further processing.

6. An FMCW radar apparatus as claimed in claim 5, wherein the processor means are provided with threshold value determining means operating on the memory field for a constant false alarm rate based on a moving window method; with thresholding means operating on the memory field; with combination means for the determination of groups of threshold passings associated with one blade flash; and with means for the determination of the range of helicopters associated with these groups and for establishing whether these helicopters are provided with an odd or an even number of blades.

7. An FMCW radar apparatus as claimed in either of claims 4 or 5, wherein the range of a helicopter is determined by the location within one spectrum of the group associated with that helicopter and the structure of the rotor by the width of the group.

8. An FMCW radar apparatus as claimed in claim 7, wherein the processor means are provided with second combination means for combining consecutive groups on the basis of at least substantially corresponding spectral features for obtaining blade flash repetition frequencies.

9. An FMCW radar apparatus as claimed in claim 8, wherein the antenna means are mounted for rotation around a substantially vertical search axis and provide azimuth-angle information to the processor means.

10. An FMCW radar apparatus as claimed in claim 9, wherein the second combination means are provided with an azimuth estimator for determining the azimuth angle of helicopters associated with consecutive groups having substantially corresponding spectral features on the basis of a known antenna beam width of the antenna means.

11. An FMCW radar apparatus as claimed in claim 10, wherein the processor means further comprises tracking means for combining output signals of the second combination means obtained during at least two revolutions of the antenna means, for obtaining a drive signal for an indication device containing at least range, azimuth and type information of detected helicopters.

12. An FMCW radar apparatus as claimed in claim 11, wherein the second combination means are provided with means for generating a drive signal for the indication device if a time delay between consecutive groups having substantially corresponding spectral features, satisfies given criteria.

* * * * *

UNITED STATES PATENT AND TRADEMARK OFFICE
CERTIFICATE OF CORRECTION

PATENT NO. : 5,347,282
DATED : SEPTEMBER 13, 1994
INVENTOR(S) : RICHARD E.M.G. LA GRANGE, ET AL

It is certified that error appears in the above-indentified patent and that said Letters Patent is hereby corrected as shown below:

In the Title page, section [54], change "INDENTIFICATION" to --IDENTIFICATION-.

In the Title page, block 16 of the drawing, change "GEAR PROCESSOR" to --CFAR PROCESSOR--.

Sheet 3 of 4 of the drawings, block 16 of Figure 3, change "GEAR PROCESSOR" to --CFAR PROCESSOR--.

In column 1, line 2 of the Title, change "INDENTIFICATION" to --IDENTIFICATION-.

In column 3, line 54, change "FM-GW" to --FM-CW--;
line 66, change "FM-GW" to --FM-CW--.

Signed and Sealed this

Fourteenth Day of February, 1995

Attest:

BRUCE LEHMAN

Attesting Officer

Commissioner of Patents and Trademarks